United States Patent

[11] 3,599,812

[72] Inventors Roger D. Hasstedt
4041 Hubbell Blvd., Des Moines, Iowa 50317;
Kenneth L. Hasstedt, 723 Washington, Des Moines, Iowa 50314
[21] Appl. No. 885,015
[22] Filed Dec. 15, 1969
[45] Patented Aug. 17, 1971

[54] CRANE AND TOW UNIT
10 Claims, 10 Drawing Figs.
[52] U.S. Cl. ........................................................ 214/86 A,
254/8 B, 280/415
[51] Int. Cl. ...................................................... B60p 3/12
[50] Field of Search .......................................... 214/86 A;
280/415, 475, 34 A, 150.5; 172/245; 254/8 B

[56] References Cited
UNITED STATES PATENTS
3,145,857  8/1964  Hayman et al. ............... 214/86 A
3,154,290  10/1964  Johnson ....................... 254/8 B Primary Examiner—Albert J. Makay
Attorney—Zarley, McKee & Thomte ABSTRACT: A unit in one position on caster wheels for use as a crane for lifting engines while in another position of operation being carried on a second set of wheels only for transport or towing other vehicles. The boom is extendable, pivotal and rotatable and when the unit is used as a towing device it will lift a towed vehicle through a cable arrangement on the opposite side from the boom while the boom is being raised. When the unit is in a crane position a pair of outwardly extending members having casters thereon extend below the boom and stabilize the unit while these same members in the towing position are interconnected by a hitch assembly for attachment to a towing vehicle.

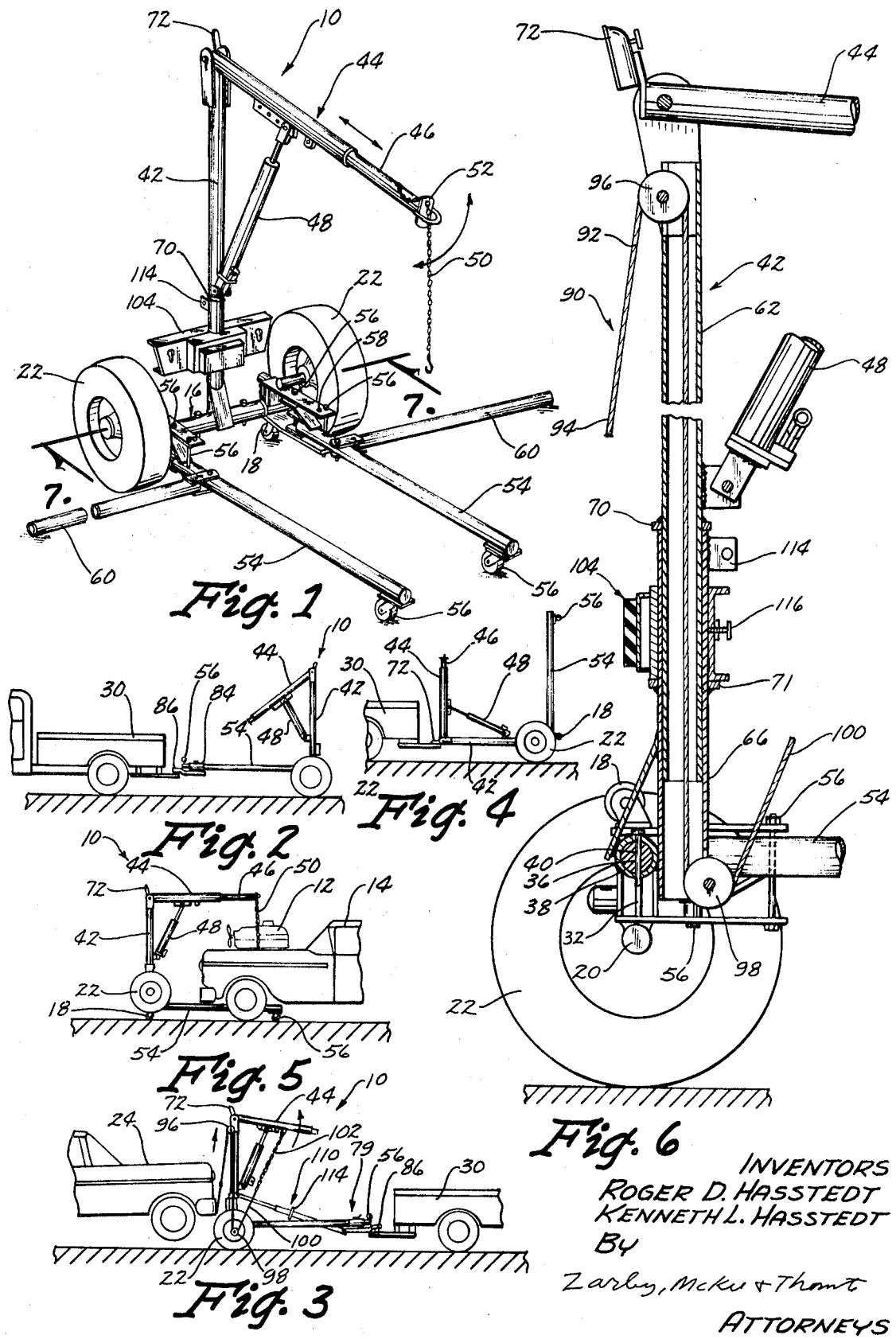

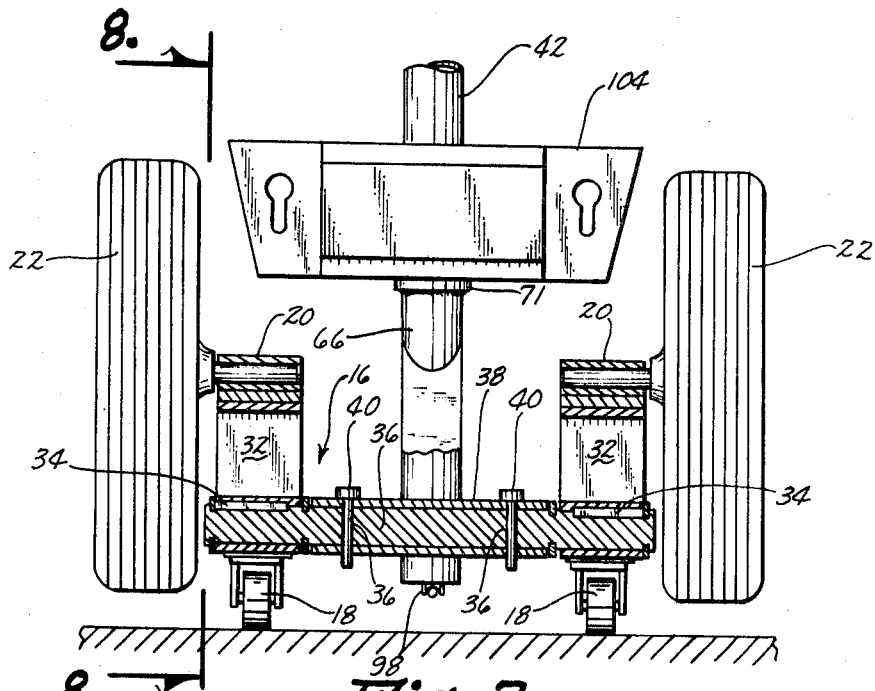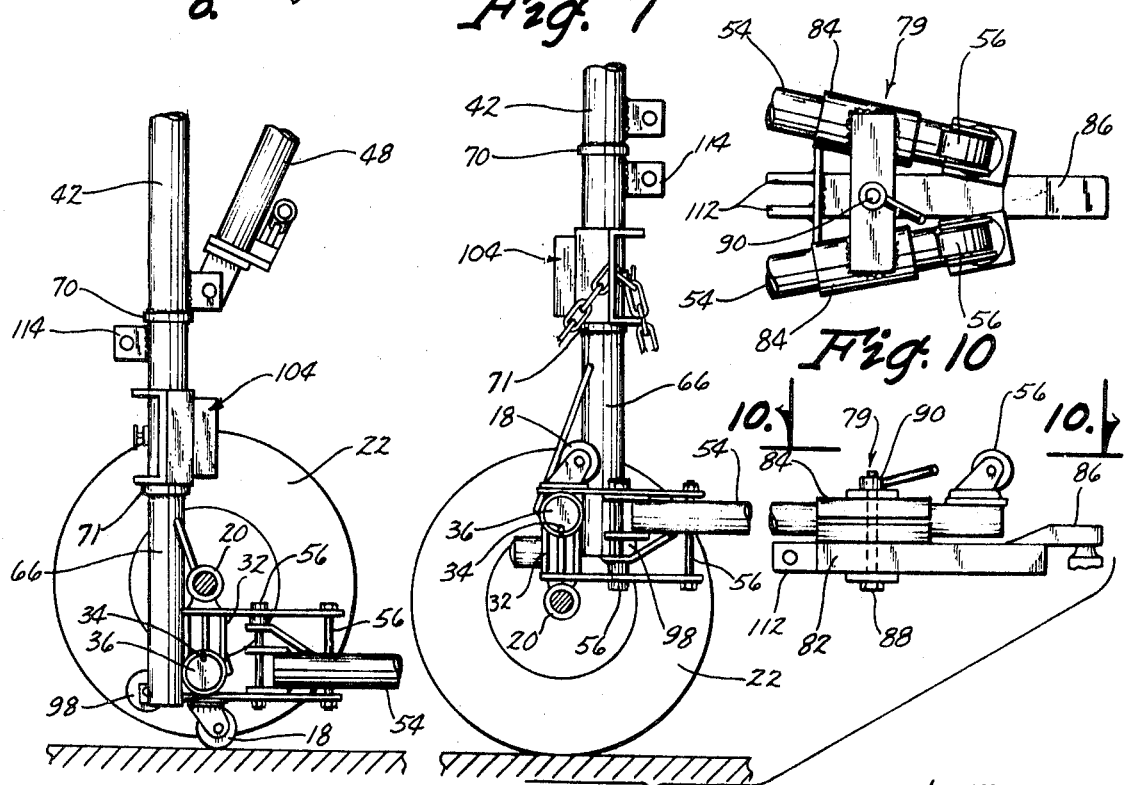

CRANE AND TOW UNIT

Vehicle service stations are commonly called upon to remove engines from automobiles which requires the use of a crane-type device and also have a significant demand for towing disabled vehicles. There is no unit presently available which will perform both of these functions. A car wrecker-type vehicle is available but is extremely expensive and thus impractical for most operators to own.

The crane and tow unit of this invention is capable of being used both as a crane and as a wrecker since it is capable of towing disabled vehicles. The simplicity of the unit makes it easily operated as a crane or towing unit and also minimizes the cost for the unit.

When the unit is being used as a crane it is desirable that it be carried on swivel or caster-type wheels such that it can be moved forwardly or sideways with ease. When the unit is being moved to another location transport wheels are desirable and when the unit is being used as a tow unit the transport wheels are used.

The conversion of the unit from a crane to a tow unit is made possible by there being a transverse frame on which two sets of wheels are provided on opposite sides thereof. A pair of arms extend perpendicularly outwardly therefrom and serve as stabilizer arms when the unit is being used as a crane and also serve to turn the frame 90° or 90° to bring the transport wheels into ground engagement. If the unit is being towed as a crane a hitch at the upper end of the crane standard is connected to a towing vehicle by pivoting the unit 90° however, if the unit is to be used as a towing vehicle the stabilizing members are pivoted 180° and a hitch assembly is connected thereto for connection to a towing vehicle. The standard on which the boom is carried will remain vertical at all times except during storage The boom is versatile in that it will pivot up and down and is extendable while rotating about the longitudinal vertical axis of the standard.

A pair of outwardly extending outrigger arms are also provided to give additional stability to the unit such that an engine carried on the boom may be lifted out of an automobile and pivoted away from the automobile where it can be worked on.

When the unit is in the towing position a cable arrangement is used which allows one end of the cable to be connected to the vehicle being towed and then the cable extends over a pulley at the top of the standard, down through the standard over a pulley at the bottom thereof and back up to an attachment with the boom such that as the boom is raised by a hydraulic jack the disabled vehicle will also be raised whereby it can be locked into engagement against the standard and the load on the cable may be released.

The standard may be pivoted forwardly or rearwardly to shift the weight on the support wheels and accordingly vary the weight on the towing vehicle as desired.

Thus it is seen that a single unit will perform readily and simply a plurality of important operations and will involve a minimum of cost while providing the maximum of dependability.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of the unit being used as a crane for lifting engines from vehicles or the like. FIG. 2 is a reduced in scale side elevation view of the unit in the towing position and being pulled behind a pickup truck.

FIG. 3 is a view similar to FIG. 2 but showing the unit beginning to lift a disabled vehicle into a towing position on the unit.

FIG. 4 is a side elevation view showing the unit in its crane position but being in a further alternate position for transport purposes.

FIG. 5 is a side elevation view showing the unit being used as a crane on the caster wheels lifting an engine out of a vehicle.

FIG. 6 is a cross-sectional side elevation view with the unit in its raised towing position supported on the transport wheels.

FIG. 7 is a cross-sectional view taken along lines 7−7 in FIG. 1 showing the cross frame rotated 180° and the swivel wheels supporting the unit being used as a crane.

FIG. 8 is a cross-sectional view taken along line 8−8 in FIG. 7.

FIG. 9 is a view similar to FIG. 8 but showing the cross frame rotated 180 degrees as when the unit is used as a towing device.

FIG. 10 is a fragmentary top plan view of the hitch assembly of the towing unit taken along line 10−10 in FIG. 9.

The crane and tow unit of this invention is referred to generally in FIG. 1 by the reference numeral 10 and is shown in the crane position for lifting the engines or the like 12 from vehicles 14 as seen in FIG. 5.

The unit includes a cross frame 16 having a first pair of wheels in the nature of swivel or caster-type wheels 18 at opposite ends of the frame as seen in FIG. 7. On opposite sides of the frame 16 are bearing sleeves 20 for a second pair of wheels 22 of the transport type which are used also for towing disabled vehicles 24 as seen in FIG. 3. It is thus seen that when the frame 16 is turned to the position of FIG. 7 and 8 the caster wheels 18 are in engagement with the ground, however, when the unit is in the position of FIG. 6 and 9 the transport wheels 22 engage the ground. Accordingly, it is seen that the cross frame 16 has been turned to 180° in moving between these respective positions. However, it should be noted that in FIG. 4 the crane unit has been pivoted 90° from its position in FIG. 1 to bring the wheels 22 into engagement with the ground for transporting the unit behind a pickup truck 30.

It is accordingly important that the spacing between the wheels 18 and 22 and the size thereof be sufficient that rotation of at least 90° will cause the larger wheels 22 to come into contact with the ground and move the caster wheels 18 out of ground engagement.

The bearing mountings 20 are carried on end members 32 which are locked by keys 34 to a center cross frame shaft 36 which extends through a sleeve 38 selectively adapted to be locked to the shaft 36 by removable pins 40.

It is seen that an upstanding standard 42 is rigidly connected to the sleeve 38 and includes a pivotal boom 44 which is provided with an extendable outer boom potion 46. The boom 44 is also pivotal on a vertical plane through operation of a hydraulic jack 48 interconnecting the boom 44 to the standard 42. A lifting chain 50 is selectively and detachably connected to the outer end of the boom section 44 through use of a connecting bracket 52.

The crane unit is stabilized through the use of a pair of elongated leg members 54 extending perpendicular to the cross frame as seen in FIG. 1 and having caster wheels 56 at their outer ends. The angle of the stabilizer arms 54 may be selectively varied through positioning of connecting bolts 56 extending through the inner ends of the arm members 54 with the outer bolt being adapted to pass through one of several openings 58 to provide for the angular adjustment. Further stabilization of the unit is made possible by the outrigger arms 60 pivotally connected to the stabilizer arms 54 and thus when the engine 12 is removed from the vehicle 14 the boom 44 may be pivoted out of alignment with the stabilizer arms 54 towards one side or the other over one of the outrigger arms 60.

In FIG. 6 it is seen that the standard 42 includes an upper sleeve 62 received in a lower support sleeve 66. A sleeve or ring forming a shoulder 70 is welded to the upper sleeve 62 while a similar sleeve or ring forming a shoulder 71 is welded to the lower sleeve 66. A bumper block unit 104 hereinafter described is rotatably and vertically slidably mounted on the bottom support sleeve 66 and rides on the top side of the shoulder 71. Thus it is seen that the downward force on the standard 42 is transmitted from the upper sleeve 62 through the annular ring or sleeve shoulder 70 to the bottom sleeve 66. Weight carried on the bumper block 104 is transmitted through the shoulder 71 to the bottom support sleeve 66.

In FIG. 4 the crane unit is seen tipped 90° from its position in FIG. 1 such that a hitch 72 at the top of the standard 42 may be connected to a hitch on the truck 30 with the ground support wheels 22 carrying the unit for transport.

The unit when being used as a tow unit is seen in use in FIGS. 3, 6 and 9. The members 54 have been pivoted 180° from their position in FIG. 1 by temporary removal of the locking pin 40 extending through the sleeve 38 and the cross frame shaft 36. Thus the caster wheels 18 are on the top side and the transport wheels 22 are on the bottom side. A hitch assembly as seen in FIGS. 9 and 10 including top and bottom halves 80 and 82 each including semicylindrical end sections 84 engage the members 54 to lock them together for providing a hitch 86 which can be connected to a truck 30 as seen in FIGS. 2 and 3. The half sections 80 and 82 are locked together by a bolt 88 having a hand operable nut 90 on the top side for drawing the sections together against the members 54.

In lifting the front end of a vehicle 24 as seen in FIG. 3, by the tow unit a cable assembly 90 is employed which includes a length of cable 92 having one end 94 connected to vehicle 24 and then extending over a pulley 96 at the to of the standard 42, thence downwardly through the standard and over a pulley 98 at the bottom thereof whereupon the other end 100 of the cable is secured selectively to a chain 102 carried by the boom 44. Accordingly, it is seen that upon operation of the hydraulic jack 48 to move the boom upwardly the cable end 94 engaging the front end of the vehicle 24 will lift the vehicle upwardly and pull it in against a pivotal bumper block 104 on the standard 42. After the vehicle is in the desired raised position the bumper may be locked by chain or the like to the bumper block 104 and the tension in the lifting cable 90 may be released to some extent and function only as a safety connection between the towing unit and the disabled vehicle 24.

Further as seen in FIG. 3, an extendable member 110 is provided pivotally connected between the members 54 between the clevis plates 112 as seen in FIG. 10 and the clevis plates 114 on the standard 42. Adjustment of the length by the handle 114 will pivot the standard 42 towards and away from the vehicles 24 and 30 to place the weight appropriately on the transport wheels 22 and the wheels of the towing vehicle 30 through the tongue 79.

The pivotal adjustment of the bumper block 104 is accomplished by adjusting the adjustment bolt 116 engaging the outer sleeve 62 as seen in FIG. 6. When a vehicle is being towed the bumper block 104 is free to rotate on the standard 42 but is limited in its downward travel by the shoulder 70.

In operation it is seen that the crane and tow unit when being used as a tow unit as viewed in FIGS. 1 and 5, the stabilizer arms 54 are moved to a position under the vehicle 14 such that the boom outer end 46 is over the engine compartment of the vehicle 14. Upon the engine 12 being lifted out of the vehicle 14 by operation of the hydraulic jack 48 the boom 44 may be pivoted to one side or the other while the unit is prevented from tipping by the outrigger arm 60. If it is desired to move the crane unit it may be pivoted 90° 90 to the position of FIG. 4 such that the hitch 72 is connected to the vehicle 30 and the ground transport wheels 22 come into operation relieving the swivel or caster wheels 18.

When it is desired to use the unit 10 as a tow unit it is only necessary to pull the pins 40 and pivot the arms 54 180° to the position of FIG. 9 such that the caster wheels 18 extend upwardly with the transport wheels 22 extending downwardly and supporting the unit. The hitch assembly 79 is quickly attached to the outer ends of the arms 54 for connecting the tongue assembly to a towing vehicle 30 as seen in FIG. 3. The boom 44 is pivoted also 180° to again extend over the arms 54 as seen in FIG. 3. The cable end 94 is then connected to the bumper of a disabled car 24 and through operation of the hydraulic jack 48 the vehicle will be lifted up against the bumper support 104 where it can be locked in place on the standard 42 by chains or the like. A small amount of tension in the cable 90 may be released such that the main load will be carried by the bumper member 104. The adjustment member 110 is placed in position between the members 54 and the standard 42 and the appropriate weight load on the wheels 22 and the towing vehicle 30 is established by pivoting the standard 42 forwardly or rearwardly. The disabled vehicle may now be towed freely and easily by the small pickup truck or the like 30. It is understood that to convert the unit back to a crane it is only necessary to follow the reverse procedure.

We claim:

1. A crane and tow unit comprising, a cross frame having an upstanding standard, a first pair of wheels also mounted at opposite ends of said cross frame,
   a second pair of wheels at opposite ends of said cross frame and being rotatable on the opposite side of said cross frame from which said first pair of wheels are rotated,
   said standard being pivotally connected to said cross frame,
   lever means connected to said frame and extending perpendicular therefrom for pivoting said cross frame relative to said standard between a first position with said first pair of wheels only engaging the ground and the second position with only said second pair of wheels engaging the ground, and
   lifting means connected to said upstanding standard.

2. The structure of claim 1 wherein said first pair of wheels are connected to said cross frame by a swivel means.

3. The structure of claim 2 wherein said second pair of wheels are substantially larger in diameter then said first pair of wheels.

4. The structure of claim 3 wherein said lever means includes in said first position a pair of spaced apart horizontally extending members having swivel wheels in engagement with the ground.

5. The structure of claim 3 wherein said lifting means includes a horizontally extending extendable boom adapted to be rotated about the longitudinal axis of said standard and power means for pivoting said boom in a vertical plane.

6. The structure of claim 3 wherein said lever means includes a pair of horizontally extending spaced-apart members when said cross frame is in said second position, and a hitch assembly interconnecting said members for connection with a towing vehicle.

7. The structure of claim 6 wherein said lifting means includes a horizontally extending boom on said standard, power means for pivoting said boom in a vertical plane, a lift cable extending over top and bottom pulleys on said standard, thence upwardly into engagement with said boom, and a vehicle griping means on the end of said cable opposite said end connected to said boom.

8. The structure of claim 7 wherein said boom and pair of members are positioned on the opposite side of said standard from said griping means, and an adjustable extension means interconnects said pair of members to said standard for selective pivoting of said standard relative to the vertical for selective positioning of a load connected to said griping means over said second pair of wheels and cross frame.

9. The structure of claim 4 wherein a hitch means is provided on the outer end of said standard, and said second pair of wheels being adapted to engage the ground only upon said pair of members being pivoted 90° to a vertical position and said standard being pivoted to a horizontal position whereby said hitch means is adapted to be connected to a towing vehicle.

10. The structure of claim 1 wherein said second pair of wheels are substantially larger in diameter than said first pair of wheels, and the relative size and location of said first and said second pair of wheels are such that pivoting of said cross frame through 90° to 180° from said first position to said second position will place only the second pair of wheels in contact with the ground.